United States Patent
Price

(10) Patent No.: US 12,369,748 B1
(45) Date of Patent: Jul. 29, 2025

(54) ADJUSTABLE CAMPFIRE GRILL STAND

(71) Applicant: Randy Price, Fort McMurray (CA)

(72) Inventor: Randy Price, Fort McMurray (CA)

(*) Notice: Subject to any disclaimer, the term of this patent is extended or adjusted under 35 U.S.C. 154(b) by 457 days.

(21) Appl. No.: 17/880,738

(22) Filed: Aug. 4, 2022

(51) Int. Cl.
*A47J 37/07* (2006.01)

(52) U.S. Cl.
CPC .... *A47J 37/0772* (2013.01); *A47J 2037/0795* (2013.01)

(58) Field of Classification Search
CPC .............................. A47J 37/0772; A47J 37/07
USPC ............................................................ 126/30
See application file for complete search history.

(56) References Cited

U.S. PATENT DOCUMENTS

| | | | |
|---|---|---|---|
| 1,175,278 A | 3/1916 | Livermore | |
| D191,186 S | 8/1961 | Maki | |
| 3,381,606 A * | 5/1968 | Kodey | A47J 37/0772 99/450 |
| 4,979,490 A | 12/1990 | Nudo et al. | |
| D356,005 S * | 3/1995 | Goble | D7/337 |
| 5,490,452 A * | 2/1996 | Schlosser | A47J 37/0694 99/422 |
| D369,939 S | 5/1996 | Gibbs | |
| D370,387 S | 6/1996 | Dorvall et al. | |
| 5,666,940 A | 9/1997 | Kreiter | |
| D396,379 S | 7/1998 | Stoetzl | |
| 6,234,162 B1 * | 5/2001 | Wenker | F24B 1/202 126/30 |
| 6,647,682 B2 | 11/2003 | Bishop | |
| 7,426,928 B2 * | 9/2008 | Sanders | F24B 1/205 126/30 |
| D592,443 S | 5/2009 | Fraser | |
| D637,446 S | 5/2011 | McMillian | |
| 7,980,241 B1 | 7/2011 | White | |
| 9,010,312 B1 * | 4/2015 | Rinderle | A47J 33/00 126/30 |
| D917,682 S | 4/2021 | Stoltzfus | |
| 2006/0102163 A1 * | 5/2006 | Sanders | A47J 33/00 126/30 |
| 2006/0112950 A1 * | 6/2006 | Czajkoski | F24B 1/182 126/30 |
| 2019/0053665 A1 * | 2/2019 | Hofer | A47J 37/0772 |

* cited by examiner

*Primary Examiner* — Connor J Tremarche
(74) *Attorney, Agent, or Firm* — Cramer Patent & Design, PLLC.; Aaron R. Cramer

(57) ABSTRACT

The present invention is directed to an adjustable campfire grilling stand. The adjustable campfire grilling stand may comprise a left side stand, a right side stand, and a center grill holder. The left side stand and the right side stand may support the center grill holder above a campfire. The center grill holder may support cookware over the campfire such that the cookware may heat food contained with the cookware. As non-limiting examples, the cookware may be a basket broiler or a fry pan. One side of a cookware bracket may be recessed to retain the basket broiler. The opposing side of the cookware bracket may be flat to support the fry pan. The height of the left side stand and the right side stand may be adjustable to compensate for uneven ground and to establish a height for the center grill holder above the campfire.

3 Claims, 12 Drawing Sheets

ADJUSTABLE CAMPFIRE GRILL STAND

RELATED APPLICATIONS

Non-applicable.

FIELD OF THE INVENTION

The present invention relates generally to a campfire grill stand and more specifically with an adjustable campfire grill stand.

BACKGROUND OF THE INVENTION

Whether cooked on a grill, or over a campfire, food cooked outdoors just always seems to taste better than food cooked indoors. It could be the outdoor air, cooking procedures, or a hundred other items, but one's taste buds just seem to explode. Many people who cook outdoors as part of a camping trip use a grill, which must be brought along for the trip including fuel, legs, cooking surfaces and the like. Even those who cook on a campfire must bring a complicated stand with multiple legs that must be pounded in the ground and always seem to tip over as soon as food is placed on it.

Another option is a complicated tripod arrangement which is difficult to set up and then can only be used with a kettle. All of these solutions are either complicated, difficult to store, hard to transport, simply don't work, and/or require many solutions depending on the type of food being cooked. Accordingly, there exists a need for a means by which virtually any type of food can be cooked over a campfire without the disadvantages as described above. The development of the adjustable campfire grill stand fulfills this need.

SUMMARY OF THE INVENTION

The principles of the present invention provide for an adjustable campfire grilling stand that has, a left side stand having a side stand base and a vertical support, the side stand base of the left side stand includes a bottom plate, a base upright, and a pair of support struts, a right side stand having a side stand base and a vertical support. The first side of the cookware bracket is recessed to retain a piece of cookware and the second side has a flat surface. The side stand base of the right side stand includes a bottom plate, a base upright, and a pair of support struts, and a center grill holder supported above a fire by the left side stand and the right side stand. The center grill holder includes a cookware bracket, a left bracket arm, and a right bracket arm and the cookware bracket having a first side and a second side.

The vertical supports may slide vertically up and down within the side stand base unless locked in place. The bottom plate may be a flat bar that rests upon a ground surface. The base upright may be square tubing coupled to a top center of the bottom plate and extends vertically upward. The vertical support may slide into the hollow center from a top the base upright. The pair of support struts may extend at an oblique angle from the top of the base upright to the end of the bottom plate on both sides of the base upright. A base wing bolt may screw into a threaded aperture at the top of the base upright. The base wing bolt may be operable to lock the height of the individual side stand by preventing the vertical support from sliding within the base upright when the base wing bolt is tightened. The pair of support struts and the vertical supports may include a vertical support upright, a vertical support tee, and a tee wing bolt. The tee wing bolt may screw into a threaded aperture at a top of the vertical support tee to prevent the center grill holder from rotating within the vertical support tee. The vertical support tee may be coupled to the top of the vertical support. The vertical support upright may be a cylindrical tube that slides up and down within the base upright. The vertical support tee may present a horizontally-oriented hollow center that may be perpendicular to the vertical support. The vertical support tee may be adapted to support an arm of the center grill holder by sliding an arm through the hollow center of the vertical support tee. The vertical support may include an outside diameter that is no larger than an inside diameter of the base upright. The left side stand and the right side stand may have an adjustable height to compensate for uneven ground and to establish a height for the center grill holder above the fire. The center grill holder may support the piece of cookware over the fire such that the piece of cookware heats food contained with the piece of cookware. The piece of cookware may be a basket broiler. The piece of cookware may be a fry pan. The cookware bracket may include a pair of cookware bracket stubs on the sides of the cookware bracket.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
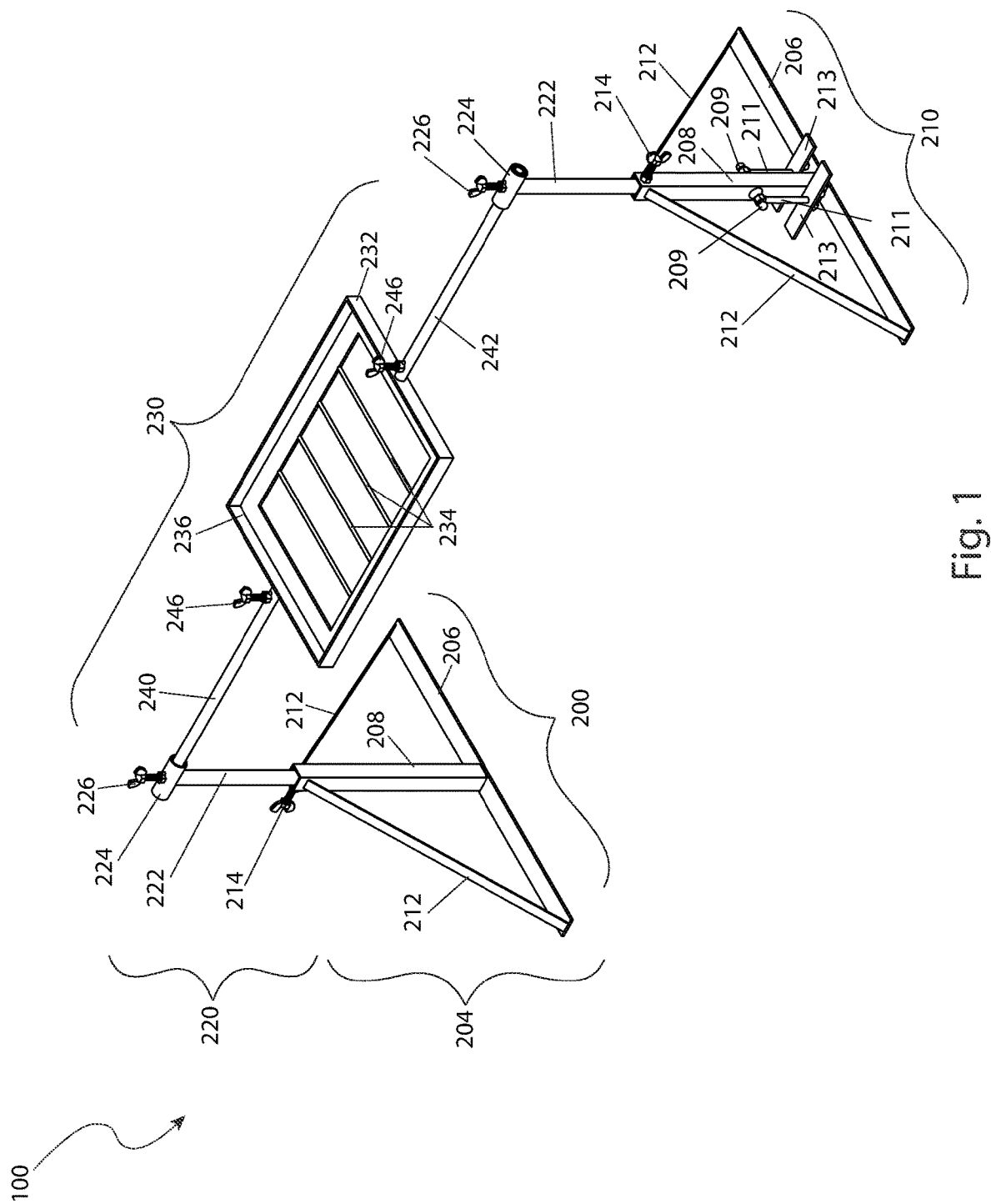
FIG. 1 is an isometric view of an adjustable campfire grilling stand, according to an embodiment of the present invention, illustrating the cookware bracket rotated to present the rectangular depression.
Figure 2:
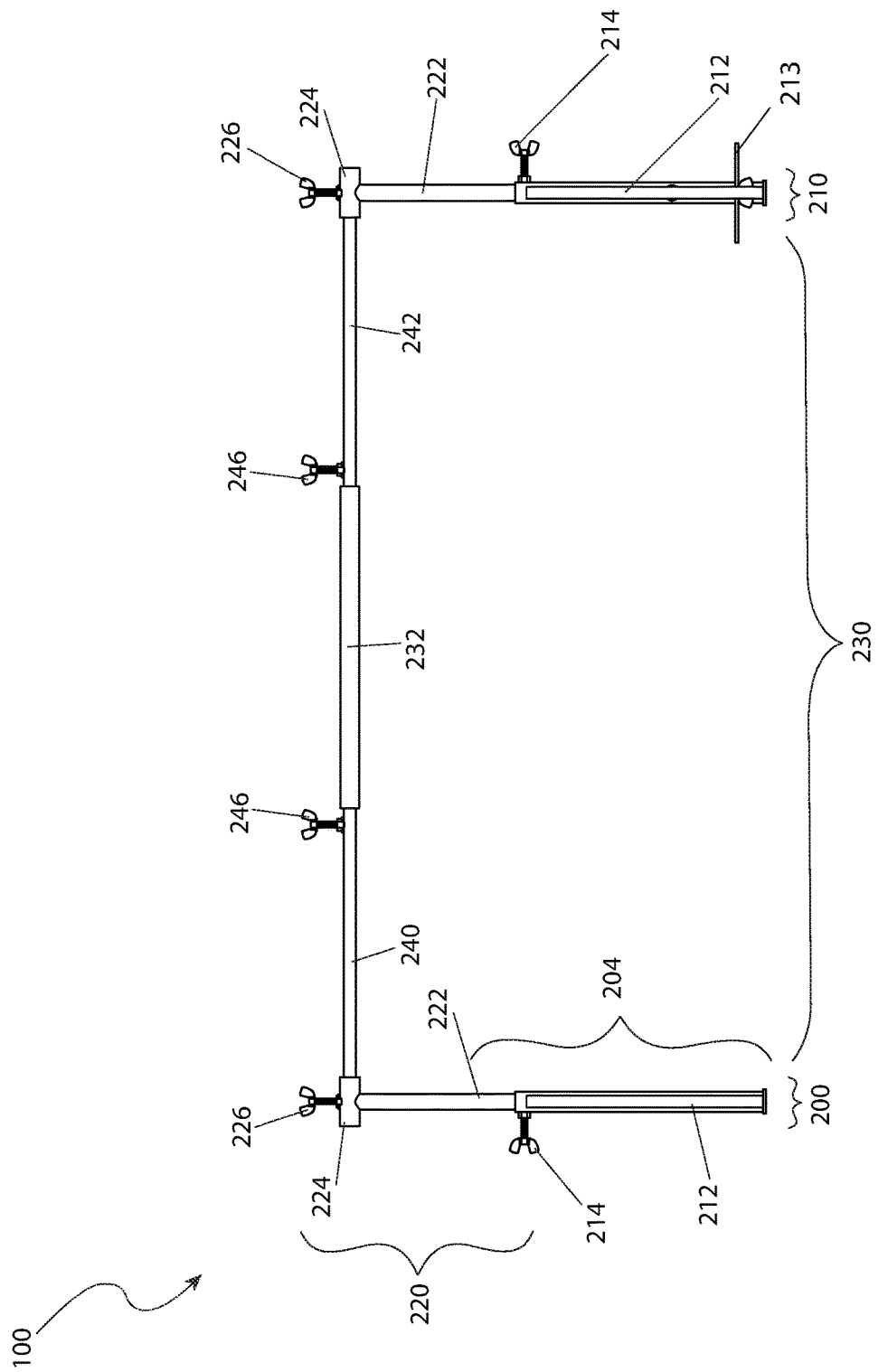
FIG. 2 is a front view of an adjustable campfire grilling stand, according to an embodiment of the present invention.
Figure 3:
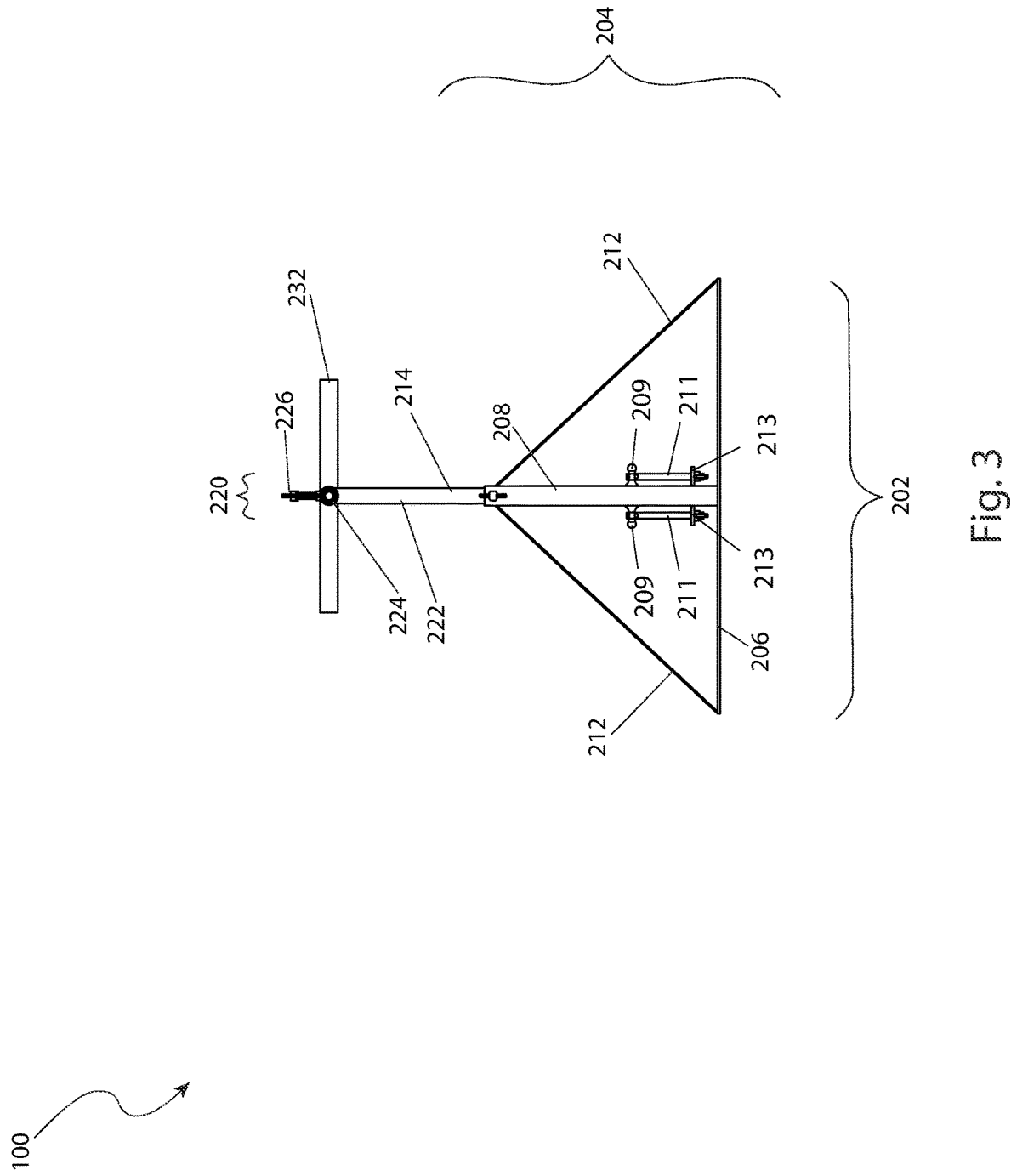
FIG. 3 is a side view of an adjustable campfire grilling stand, according to an embodiment of the present invention.
Figure 4:
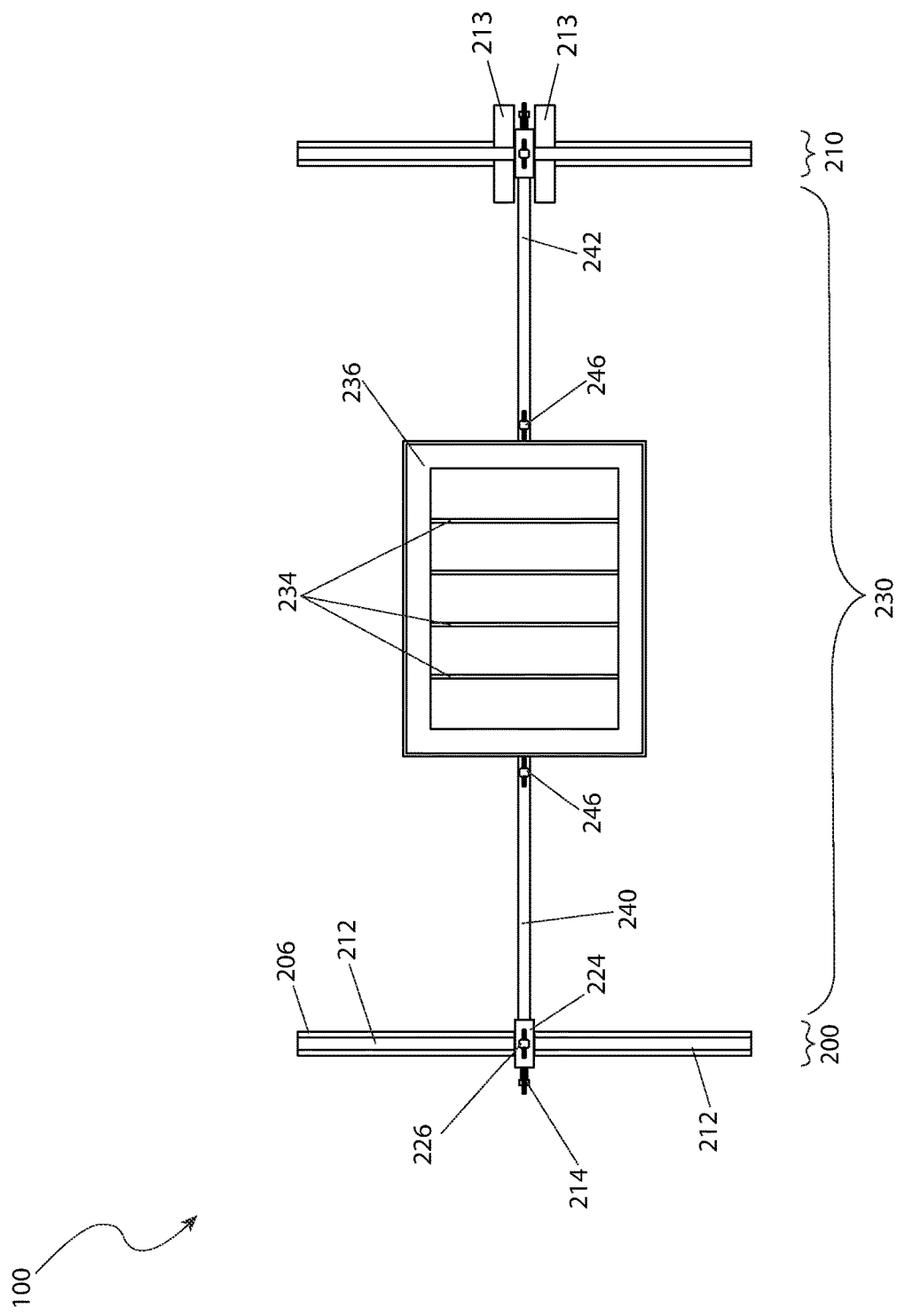
FIG. 4 is a top view of an adjustable campfire grilling stand, according to an embodiment of the present invention.
Figure 5:
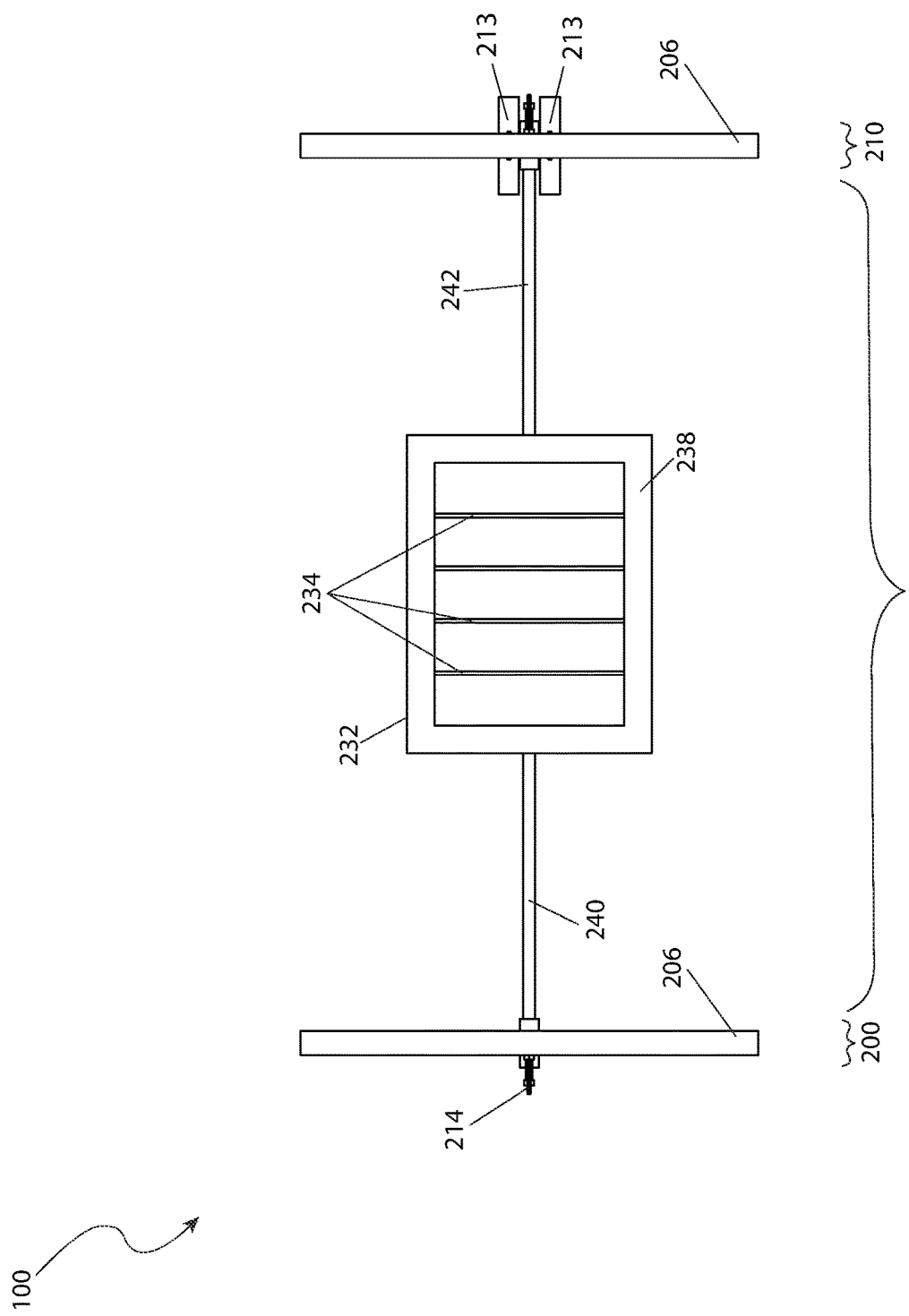
FIG. 5 is a bottom view of an adjustable campfire grilling stand, according to an embodiment of the present invention.
Figure 6:
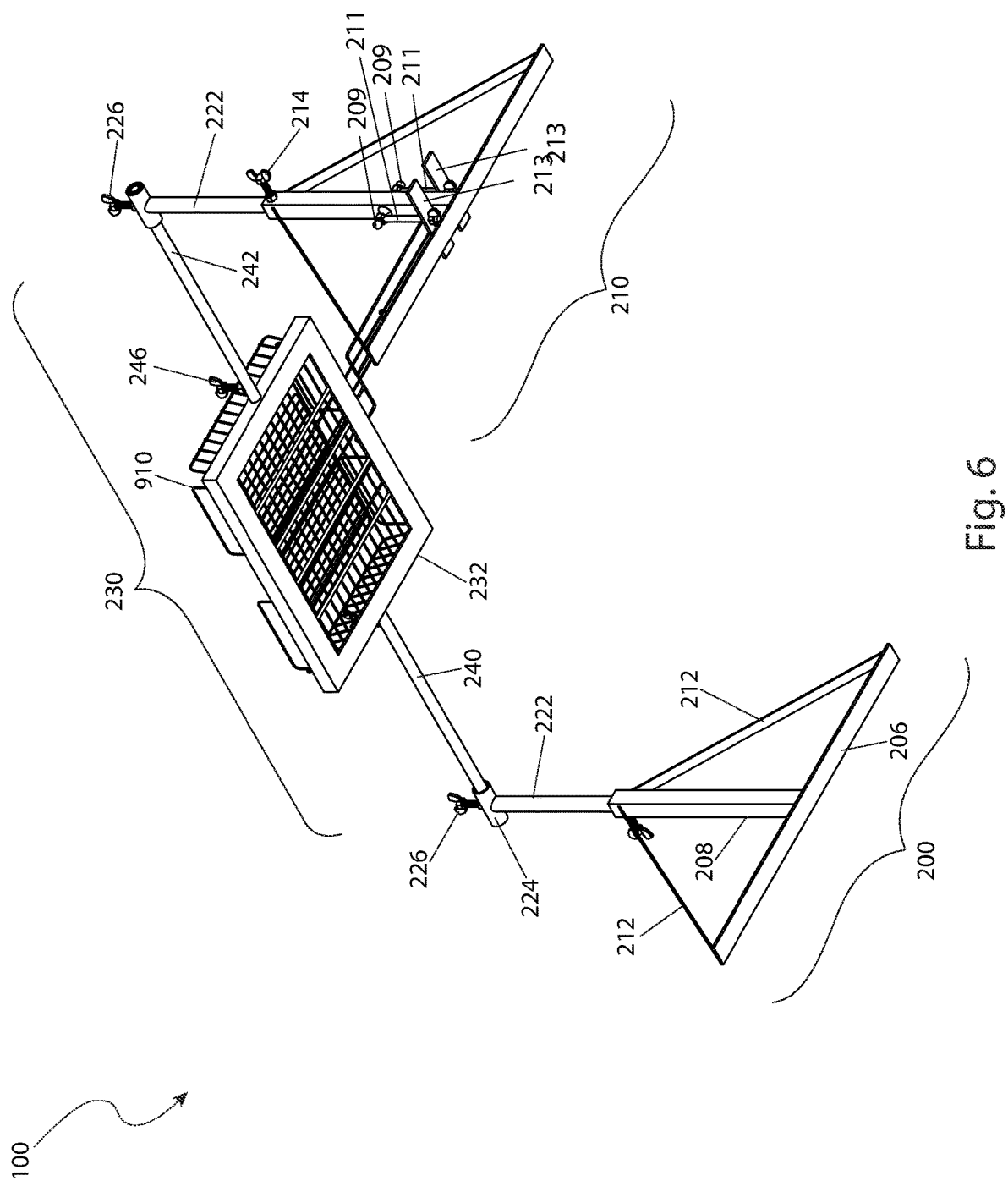
FIG. 6 is an isometric detail view of an adjustable campfire grilling stand, according to an embodiment of the present invention, illustrating the basket broiler in place on the cookware bracket.
Figure 7:
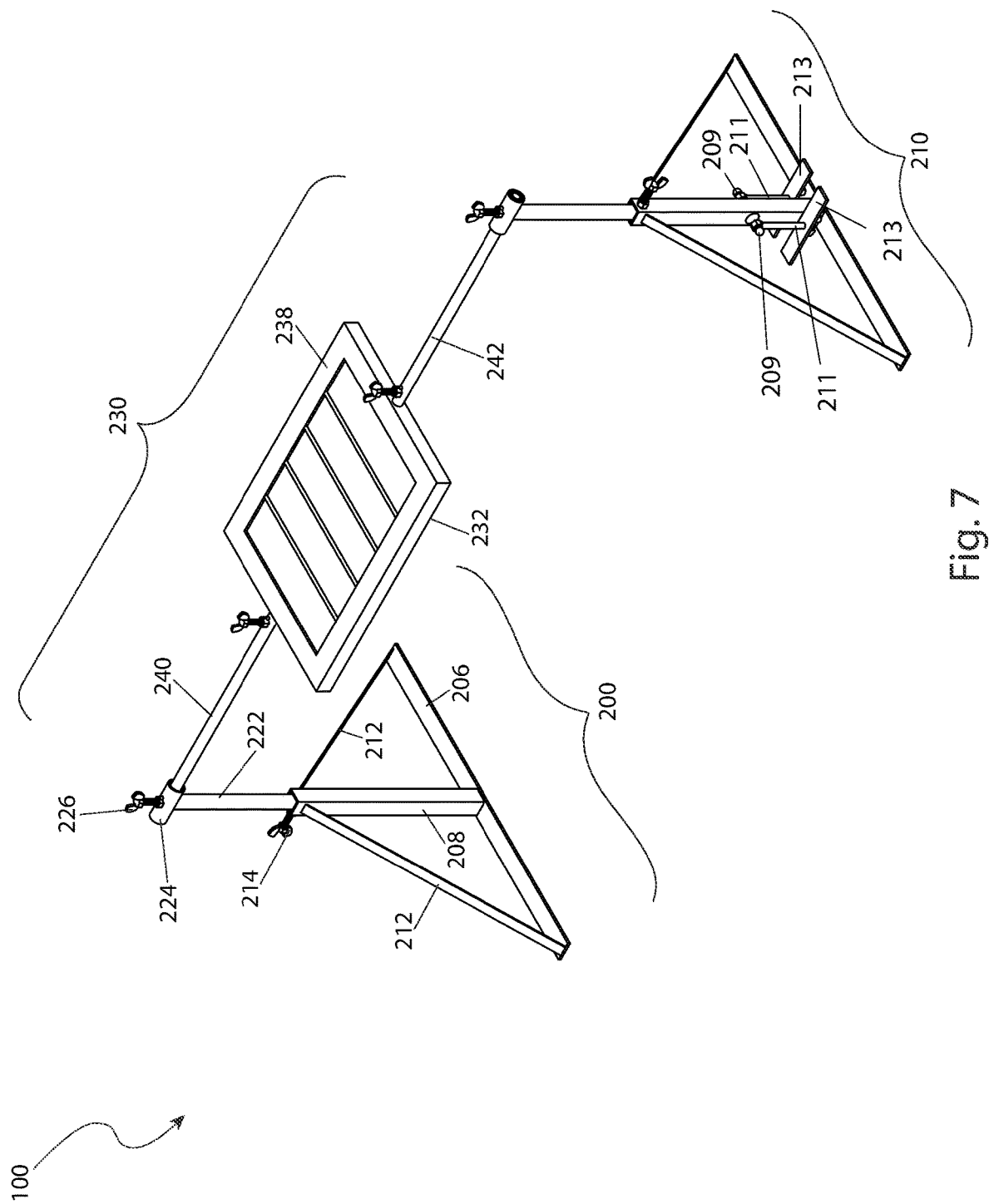
FIG. 7 is an isometric view of an adjustable campfire grilling stand, according to an embodiment of the present invention, illustrating the cookware bracket rotated to present the flat surface.
Figure 8:
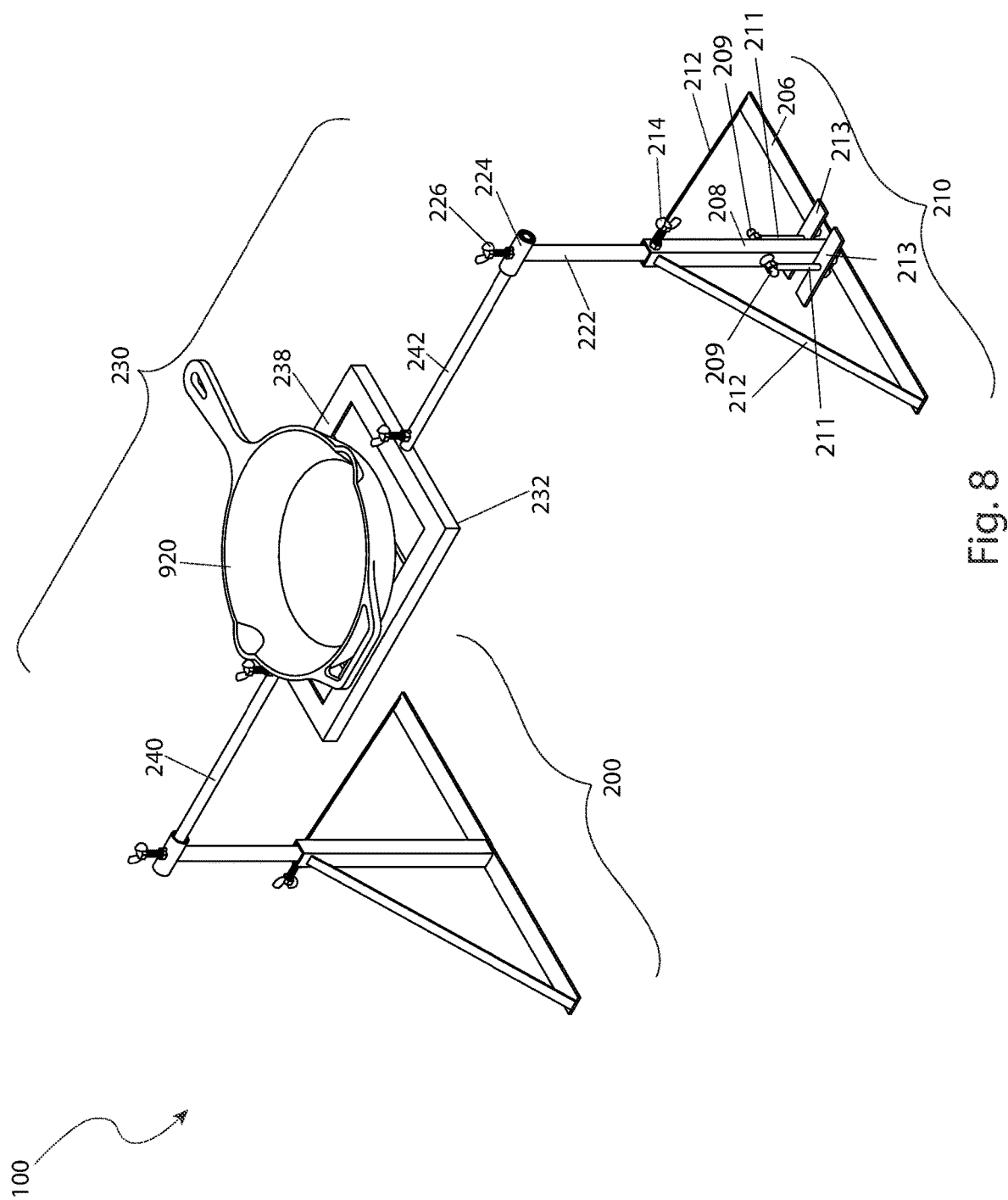
FIG. 8 is an isometric detail view of an adjustable campfire grilling stand, according to an embodiment of the present invention, illustrating the fry pan in place on the cookware bracket.
Figure 9:
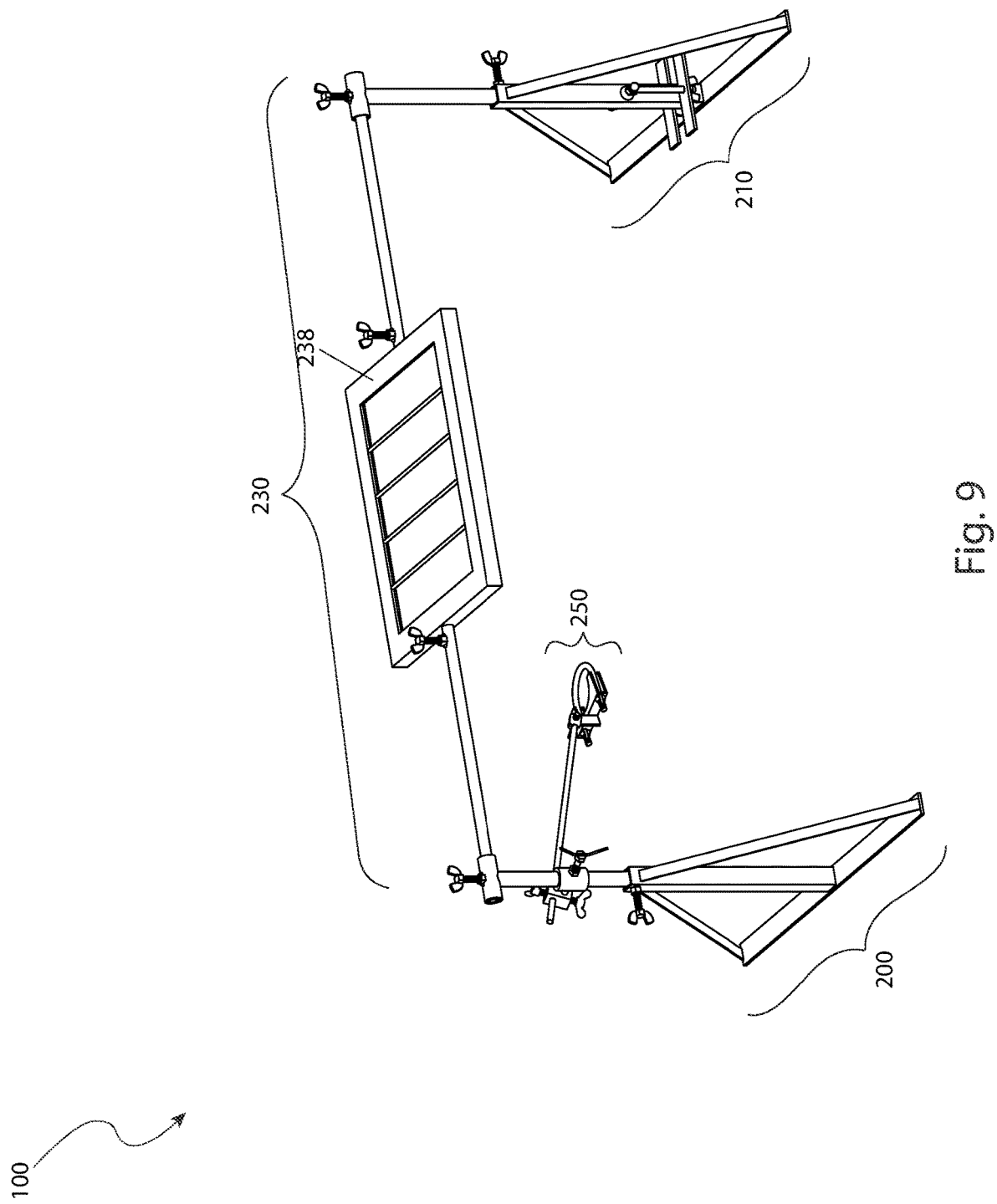
FIG. 9 is an isometric view of an adjustable campfire grilling stand, according to an embodiment of the present invention, illustrating the can holder in place.
Figure 10:
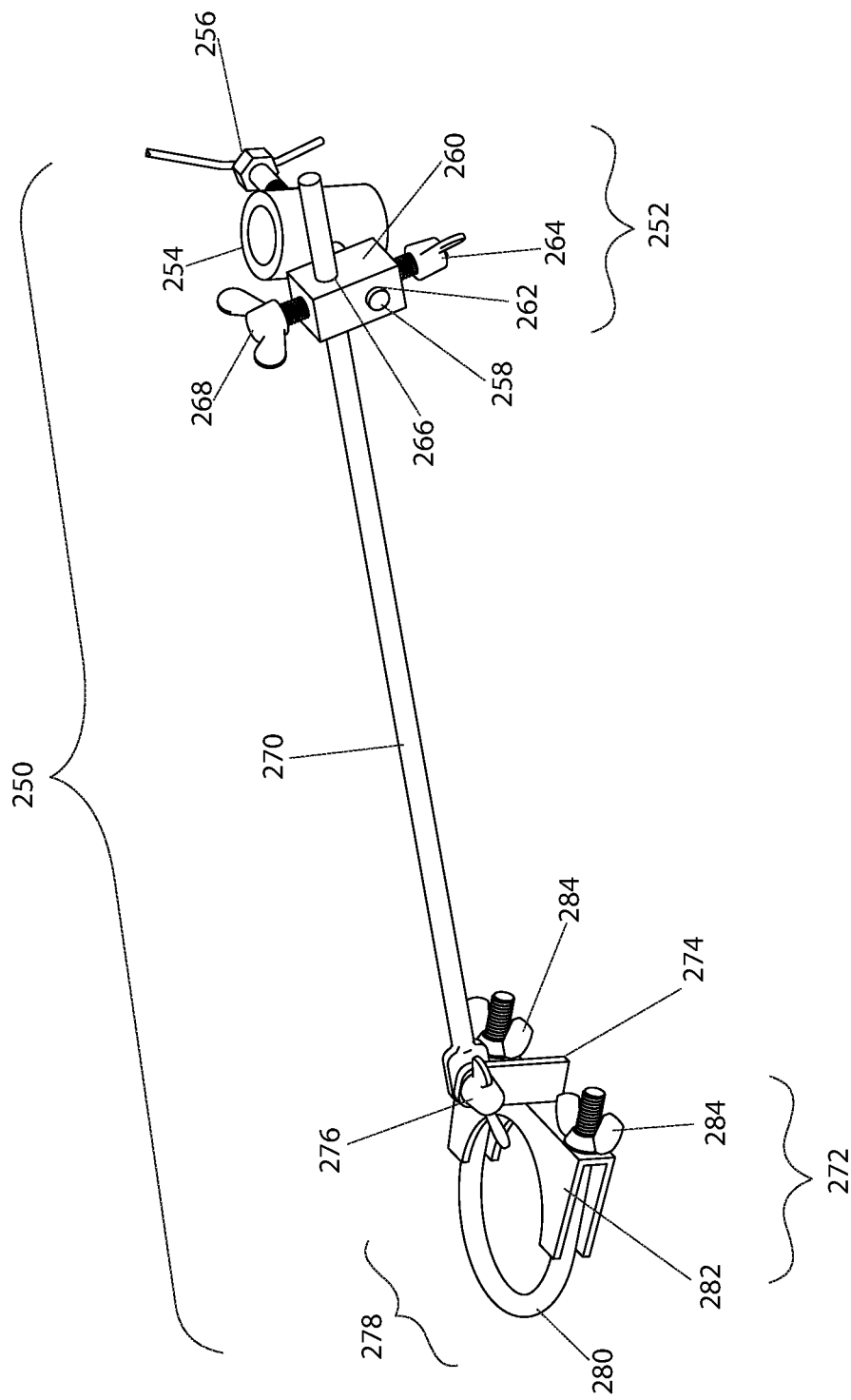
FIG. 10 is an isometric view of the can holder, according to an embodiment of the present invention.
Figure 11:
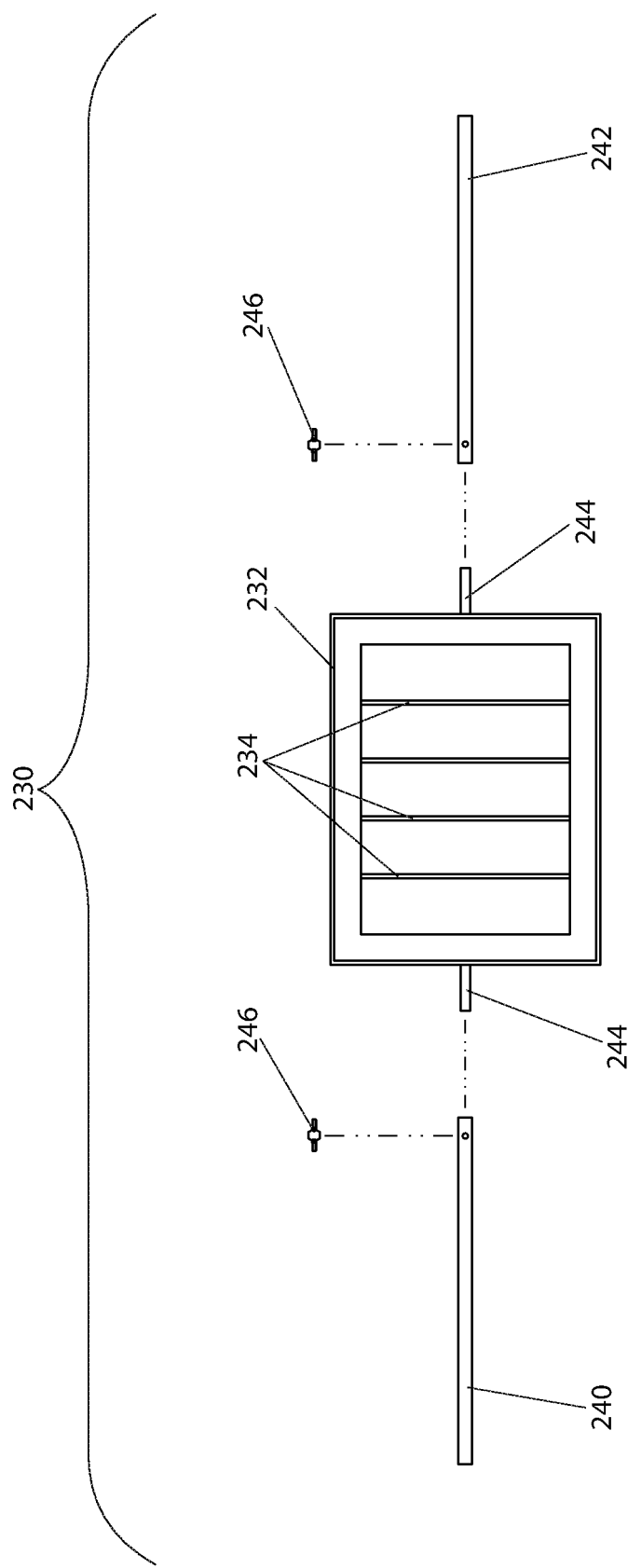
FIG. 11 is a detail view of the center grill holder, according to an embodiment of the present invention, illustrating detachment of the left bracket arm and the right bracket arm.
Figure 12:
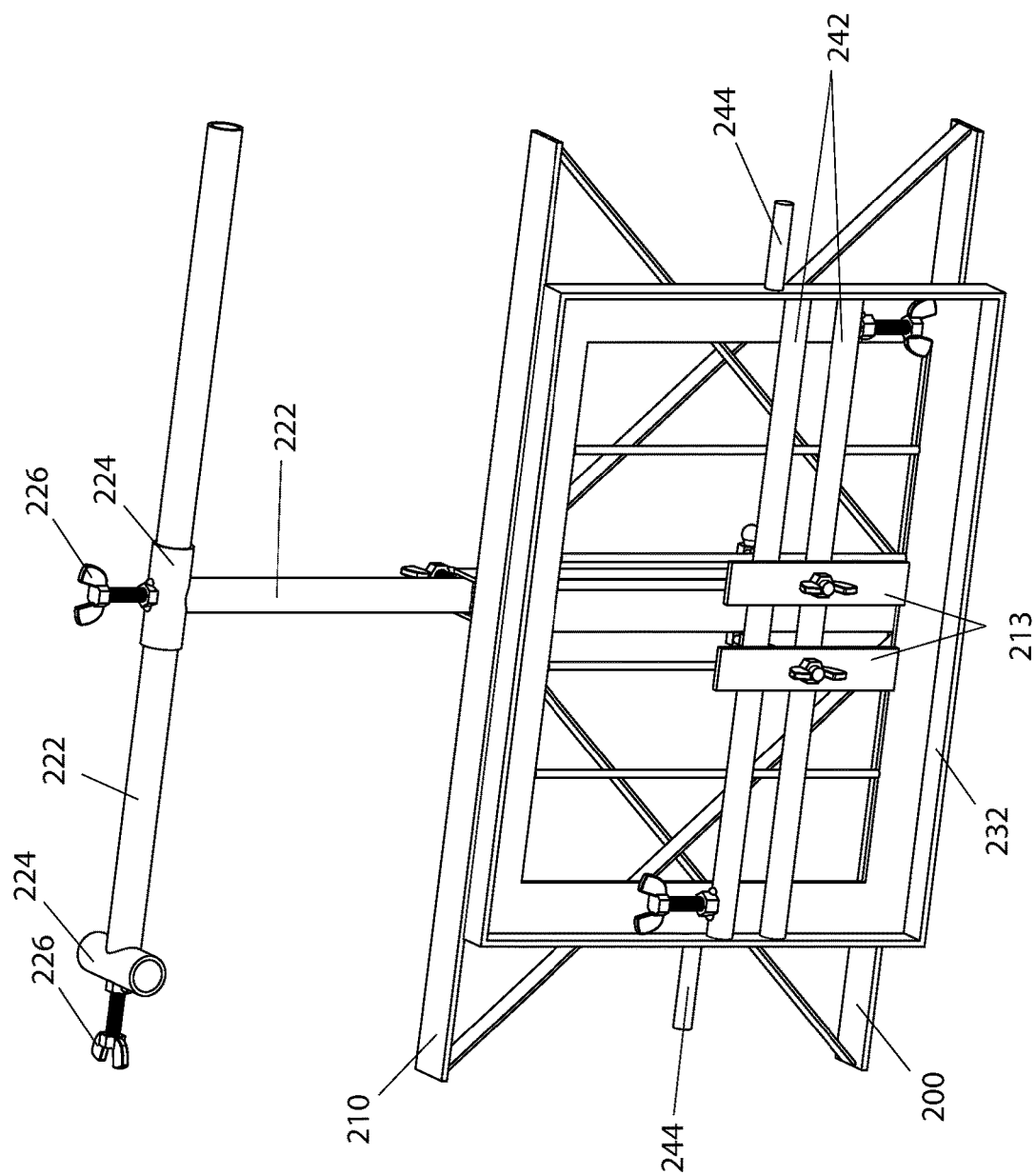
FIG. 12 is a perspective view of the adjustable campfire grilling stand disassembled into a portable configuration.

DESCRIPTIVE KEY 100 adjustable campfire grilling stand
200 left side stand
202 individual side stand
204 side stand base
206 bottom plate
208 base upright
209 bar pivot
210 right side stand
211 bar arm
212 support strut
213 bar
214 base wing bolt
220 vertical support
222 vertical support upright
224 vertical support tee
226 tee wing bolt
230 center grill holder
232 cookware bracket
234 rod
236 rectangular depression
238 flat surface
240 left bracket arm
242 right bracket arm
244 cookware bracket stub
246 bracket arm wing bolt
250 can holder
252 side stand mount
254 mounting tube
256 height adjusting wing bolt
258 arm holder shaft
260 arm holder
262 shaft aperture
264 angle adjusting wing bolt
266 arm aperture
268 length adjusting wing bolt
270 can holder arm
272 can mount
274 can armature
276 can armature wing bolt
278 U clamp
280 U bolt
282 saddle
284 U clamp wing nut
910 basket broiler
920 fry pan

1. DESCRIPTION OF THE INVENTION

The present invention is directed to an adjustable campfire grilling stand (herein described as the "invention") 100. The invention 100 may comprise a left side stand 200, a right side stand 210, and a center grill holder 230. The left side stand 200 and the right side stand 210 may support the center grill holder 230 above a campfire. The center grill holder 230 may support cookware over the campfire such that the cookware may heat food contained with the cookware. As non-limiting examples, the cookware may be a basket broiler 910 or a fry pan 920. One (1) side of a cookware bracket 232 may be recessed to retain the basket broiler 910. The opposing side of the cookware bracket 232 may be flat to support the fry pan 920. The height of the left side stand 200 and the right side stand 210 may be adjustable to compensate for uneven ground and to establish a height for the center grill holder 230 above the campfire.

The left side stand 200 and the right side stand 210 may support the left and right sides of the center grill holder 230, respectively. An individual side stand 202 selected from the left side stand 200 and the right side stand 210 may comprise a side stand base 204 and a vertical support 220. The vertical support 220 may slide vertically up and down within the side stand base 204 unless locked in place.

The side stand base 204 may comprise a bottom plate 206, a base upright 208, and a pair of support struts 212. The bottom plate 206 may be a flat bar that may rest upon the ground. The base upright 208 may be square tubing coupled to the top center of the bottom plate 206 and extending vertically upward. The vertical support 220 may slide into the hollow center of the base upright 208 from the top. The pair of support struts 212 may extend at an oblique angle from the top of the base upright 208 to the end of the bottom plate 206 on both sides of the base upright 208. A base wing bolt 214 may screw into a threaded aperture at the top of the base upright 208. The base wing bolt 214 may be operable to lock the height of the individual side stand 202 by preventing the vertical support 220 from sliding within the base upright 208 when the base wing bolt 214 is tightened.

The vertical support 220 may comprise a vertical support upright 222, a vertical support tee 224, and a tee wing bolt 226. The vertical support upright 222 may be a cylindrical tube that may slide up and down within the base upright 208. The vertical support 220 may have an outside diameter that is no larger than the inside diameter of the base upright 208. The vertical support tee 224 may be coupled to the top of the vertical support 220. The vertical support tee 224 may present a horizontally-oriented hollow center that may be perpendicular to the vertical support 220. The vertical support tee 224 may be adapted to support an arm of the center grill holder 230 by sliding the arm through the hollow center of the vertical support tee 224. The tee wing bolt 226 may screw into a threaded aperture at the top of the vertical support tee 224 to prevent the center grill holder 230 from rotating within the vertical support tee 224.

During use, the hollow center of the vertical support tee 224 may be oriented to be perpendicular to the plane of the bottom plate 206 such that the center grill holder 230 may cross over the campfire while the bottom plate 206 may be aligned tangentially with the campfire.

The center grill holder 230 may comprise the cookware bracket 232, a left bracket arm 240, and a right bracket arm 242. The center grill holder 230 may support the cookware above the campfire when the center grill holder 230 is elevated by the left side stand 200 and the right side stand 210.

The cookware bracket 232 may be a rectangular armature that is configured to hold the cookware. The cookware bracket 232 may be constructed from a plurality of angle irons such that one side of the cookware bracket 232 presents a rectangular depression 236 and the opposite side of the cookware bracket 232 presents a flat surface 238. The rectangular depression 236 may be configured to hold the basket broiler 910 when the center grill holder 230 is rotated such that the rectangular depression 236 faces up. The flat surface 238 may be configured to support the fry pan 920 when the center grill holder 230 is rotated such that the flat surface 238 faces up.

The cookware bracket 232 may comprise a plurality of rods 234 that are coupled between opposing sides of the cookware bracket 232 to prevent the cookware from falling through the plurality of angle irons.

The left bracket arm 240 and the right bracket arm 242 may extend laterally away from the cookware bracket 232 on opposite sides of the cookware bracket 232. The left bracket arm 240 and the right bracket arm 242 may couple to the centers of the opposite sides of the cookware bracket 232 such that the center grill holder 230 is balanced. The left bracket arm 240 may pass through the hollow center of the vertical support tee 224 on the left side stand 200 and the right bracket arm 242 may pass through the hollow center of the vertical support tee 224 on the right side stand 210. The cookware bracket 232 may be rotated when the tee wing bolt 226 on the left side stand 200 and the tee wing bolt 226 on the right side stand 210 are loosened such that either the rectangular depression 236 or the flat surface 238 may be placed on top. Tightening the tee wing bolt 226 on the left side stand 200 and the tee wing bolt 226 on the right side stand 210 may prevent rotation of the cookware bracket 232.

In some embodiments, the left bracket arm 240 and the right bracket arm 242 may detach from the cookware bracket 232 such that the invention 100 disassembles into smaller pieces for transportation. In such embodiments, the cookware bracket 232 may comprise a pair of cookware bracket stubs 244 on the opposite sides of the cookware bracket 232. The left bracket arm 240 and the right bracket arm 242 may couple to the pair of cookware bracket stubs 244 during use and may decouple from the pair of cookware bracket stubs 244 for transportation and/or storage. The left bracket arm 240 and the right bracket arm 242 may each slide over one (1) of the pair of cookware bracket stubs 244 and may be retained by a bracket arm wing bolt 246.

The invention 100 may further comprise a can holder 250. The can holder 250 may be an accessory that may couple to the left side stand 200 or to the right side stand 210. The can holder 250 may be operable to hold a can of food over the campfire in order to heat the food contained within the can of food. The can holder 250 may comprise a side stand mount 252, a can holder arm 270, and a can mount 272.

The side stand mount 252 may couple to the vertical support upright 222 of the left side stand 200 or the right side stand 210 such that the side stand mount 252 may be elevated above the ground. The side stand mount 252 may comprise a mounting tube 254 and an arm holder 260. The mounting tube 254 that may couple to the vertical support upright 222 by surrounding the vertical support upright 222. A height adjusting wing bolt 256 may pass through a threaded aperture in the mounting tube 254 such that the height of the can holder 250 may be adjusted by loosening the height adjusting wing bolt 256, sliding the mounting tube 254 up or down, and tightening the height adjusting wing bolt 256. The mounting tube 254 may comprise an arm holder shaft 258 that projects laterally from the mounting tube 254. The arm holder shaft 258 may pass through a shaft aperture 262 in the arm holder 260.

The arm holder 260 may pivotably couple the can holder arm 270 to the mounting tube 254. The arm holder 260 may pivot around the arm holder shaft 258 such that the angle of the can holder arm 270 may be adjusted. An angle adjusting wing bolt 264 may pass through a threaded aperture in the arm holder 260. The angle adjusting wing bolt 264 may be loosened to pivot the arm holder 260 up or down and may be tightened to prevent pivoting.

The arm holder 260 may comprise an arm aperture 266 that the can holder arm 270 may pass through. The arm holder 260 may be held in place by a length adjusting wing bolt 268 that passes through a threaded aperture in the arm holder 260. The length of the can holder arm 270 as measured between the can of food and the vertical support upright 222 may be changed by loosening the length adjusting wing bolt 268, sliding the can holder arm 270, and tightening the length adjusting wing bolt 268.

The can holder arm 270 may extend from the side stand mount 252 towards the center of the campfire. The can holder arm 270 may support the can mount 272 above the campfire.

The can mount 272 may couple to the can holder arm 270 in order to support the can of food over the campfire. The can mount 272 may comprise a can armature 274 and a U clamp 278. The can armature 274 may be coupled to a saddle 282 of the U clamp 278. The can mount 272 may pivotably couple to the can holder arm 270 via a can armature wing bolt 276. The can armature 274, and thus the U clamp 278, may be pivoted by loosening the can armature wing bolt 276, pivoting the can armature 274, and tightening the can armature wing bolt 276.

The U clamp 278 may retain the can of food to the can holder 250. The can of food may be captured between a U bolt 280 and the saddle 282 of the U clamp 278 and held in place by a pair of U clamp wing nuts 284. The can of food may be removed from the can holder 250 by removing the pair of U clamp wing nuts 284 and sliding the U clamp 278 out of the saddle 282.

In use, the invention 100 may be erected at a campfire by placing the left side stand 200 and the right side stand 210 on opposites sides of the campfire, sliding the left bracket arm 240 of the center grill holder 230 through the vertical support tee 224 of the left side stand 200, and sliding the right bracket arm 242 of the center grill holder 230 through the vertical support tee 224 of the right side stand 210. The height of the cookware bracket 232 above the campfire may be adjusted by loosening the base wing bolts 214 on the left side stand 200 and/or the right side stand 210, sliding the vertical supports 220 up or down, and tightening the base wing bolts 214. The center grill holder 230 may be rotated by loosening the tee wing bolts 226 on the left side stand 200 and on the right side stand 210, rotating the center grill holder 230, and tightening the tee wing bolts 226. The center grill holder 230 may be rotated to place the rectangular depression 236 facing up for when using the basket broiler 910 or with the flat surface 238 facing up when using the fry pan 920.

The invention 100 may be disassembled for transporting and/or storing. The can holder 250 may detach from the left side stand 200 or the right side stand 210. The vertical support 220 may detach from the side stand base 204 for both the left side stand 200 and the right side stand 210. The left bracket arm 240 and the right bracket arm 242 may detach from the cookware bracket 232. The wing bolts and wing nuts may be threaded back into place on the detached parts. The disassembled components may stack neatly to take up minimal space. On either or both base upright 208 of the left side stand 200 or right side stand 210 are a pair of bar pivots 209 vertically aligned on opposing sides surfaces thereof. Pivotally attached to each bar pivot 209 is a proximal end of an individual bar arm 211. The bar arm 211 is preferably a cylindrical rod. Attached to the distal end of a respective bar arm 211 is a bar 213, preferably constructed of flat stock and oriented such that it can pivot coincidentally with the respective bar arm 209. The bar 211 is attached at its center to the distal end of the bar arm 21. After disassembly of the invention 100, the bars 211 of either or both sides of the base upright 208, on either or both the left side stand 200 or right side stand 210 can pivot to a position so as to link or couple the disassembled portions of the invention 100 together for ease in transport and storage.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An adjustable campfire grilling stand, comprising:
    a left side stand having a left side stand base and a left vertical support, the left side stand base including a left bottom plate, a left base upright comprising square tubing, and a pair of left support struts extending obliquely from the left base upright to opposing ends of the left bottom plate;
    a right side stand having a right side stand base and a right vertical support, the right side stand base including a right bottom plate, a right base upright comprising square tubing, and a pair of right support struts extending obliquely from the right base upright to opposing ends of the right bottom plate;
    a center grill holder supported above a fire by the left and right side stands, the center grill holder including a cookware bracket, a left bracket arm, and a right bracket arm; wherein the cookware bracket comprises:
        a first side with a rectangular depression formed by a plurality of angle irons to retain a basket broiler;
        a second side with a flat surface to support a fry pan; and,
        a plurality of rods spanning between the angle irons on the first side to prevent cookware from falling through;
    wherein the left and right vertical supports each include:
        a vertical support upright slidably engaged within the respective left or right base upright;
        a vertical support tee coupled to a top end of the vertical support upright, the vertical support tee having a horizontally-oriented hollow center perpendicular to the vertical support upright; and,
        a tee wing bolt threaded into the vertical support tee to secure the respective left or right bracket arm within the hollow center and prevent rotation of the center grill holder; and,
    wherein the left and right base uprights each include a pair of bar pivots on opposing sides, each bar pivot pivotally attaching a bar arm with a bar configured to link disassembled components of the grilling stand during transport.

2. The adjustable campfire grilling stand of claim 1, further comprising a can holder detachably coupled to one of the left or right vertical supports, the can holder including:
    a mounting tube slidably engaging the vertical support upright and secured by a height-adjusting wing bolt;
    a can holder arm extending from the mounting tube through an arm holder with an angle-adjusting wing bolt; and,
    a U-clamp coupled to the can holder arm via a can armature wing bolt, the U-clamp comprising a U-bolt and saddle to retain a food can over the fire.

3. The adjustable campfire grilling stand of claim 1, wherein the left and right bracket arms are detachable from the cookware bracket via cookware bracket stubs on opposing sides of the cookware bracket, each stub receiving a bracket arm secured by a bracket arm wing bolt.

* * * * *